United States Patent
Rajagopalan et al.

(10) Patent No.: US 6,518,357 B1
(45) Date of Patent: Feb. 11, 2003

(54) FLAME RETARDANT POLYCARBONATE-SILSESQUIOXANE COMPOSITIONS, METHOD FOR MAKING AND ARTICLES MADE THEREBY

(75) Inventors: Padmavathy Rajagopalan, Cambridge, MA (US); John Robert Campbell, Clifton Park, NY (US); Larry Neil Lewis, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 9 days.

(21) Appl. No.: 09/678,237

(22) Filed: Oct. 4, 2000

(51) Int. Cl.⁷ .............. C08K 3/22; C08K 5/42; C08L 83/06; C08L 69/00
(52) U.S. Cl. ............ 524/588; 524/161; 524/162; 524/409; 524/410; 524/537; 524/611
(58) Field of Search ............. 524/588, 161, 524/162, 409, 410, 157, 611, 537

(56) References Cited

U.S. PATENT DOCUMENTS

| | | | |
|---|---|---|---|
| 3,986,997 A | | 10/1976 | Clark |
| 4,275,118 A | | 6/1981 | Baney et al. |
| 4,529,752 A | | 7/1985 | Bluestein |
| 4,916,194 A | | 4/1990 | Policastro et al. |
| 4,994,510 A | * | 2/1991 | Near et al. |
| 5,010,148 A | | 4/1991 | Lewis |
| 5,352,747 A | * | 10/1994 | Ohtsuka et al. |
| 5,484,867 A | * | 1/1996 | Lichtenhan et al. |
| 5,486,564 A | | 1/1996 | Mine et al. |
| 5,589,562 A | | 12/1996 | Lichtenhan et al. |
| 6,284,824 B1 | | 9/2001 | Iji et al. .............. 524/267 |
| 6,362,279 B2 | * | 3/2002 | Lichtenhan et al. ......... 525/105 |

FOREIGN PATENT DOCUMENTS

| | | |
|---|---|---|
| DE | 19850453 | 5/1999 |
| EP | 0415070 A2 | 6/1991 |
| EP | 0604130 A2 | 6/1994 |
| EP | 0 829 521 A1 | 3/1998 |
| EP | 0 712 901 A3 | 5/1998 |
| JP | A 10-139964 | 5/1998 |

OTHER PUBLICATIONS

U.S. Patent Application Publication No. 2001/0018486 A1 (Lichtenhan et al ) published Aug. 30, 2001 on patent application Ser. No. 09/215,357 filed Dec. 18, 1998.*

* cited by examiner

*Primary Examiner*—Peter Szekely
(74) *Attorney, Agent, or Firm*—Bernadette M. Bennett; Noreen C. Johnson

(57) ABSTRACT

A flame retardant polycarbonate composition includes (A) at least one polycarbonate and (B) a silsesquioxane flame retardant. The flame retardant polycarbonate composition can be made by providing a polycarbonate and incorporating a flame retardant amount of a silsesquioxane into the polycarbonate. An article can be molded from the composition.

47 Claims, No Drawings

FLAME RETARDANT POLYCARBONATE-SILSESQUIOXANE COMPOSITIONS, METHOD FOR MAKING AND ARTICLES MADE THEREBY

BACKGROUND OF THE INVENTION

The present invention relates to a flame retardant (FR) halogen-free aromatic polycarbonate (PC) composition.

Many applications require that a polycarbonate composition be flame retardant and combine ease of processing with good optical properties. Typically, flame retardancy is obtained through the use of additives, which are halogen or heavy metal-containing compositions that may form toxic materials when heated. There is an increasing awareness of the effects of these materials and increasing demand for polycarbonate compositions that do not contain potentially toxic flame retardant additives.

Siloxane additives are known to enhance flame retardant properties of polycarbonate compositions. Compression molded 1/16 inch bars of polycarbonate compositions with siloxane additives that have condensed triorganosiloxy units can pass the UL94 test with VO rating. See "Flammability of Plastic Materials Bulletin" of Jan. 24, 1980. Aromatic polyester siloxane-containing polycarbonate compositions also exhibit flame retardant properties. However, these polycarbonate compositions can be difficult to process due to incompatibility of the siloxane additive with the polycarbonate.

There is a need for a flame retardant additive for polycarbonate compositions that is sufficiently flame-retardant to obtain a satisfactory UL94 rating, that does not form toxic materials, that imparts good flow as measured by a satisfactory high melt flow index value, that does not affect optical properties, and that improves processibility. Particularly, there is a need for a flame retardant polycarbonate composition that meets UL94 requirements for VO rating at 1/16 inch thickness. Additionally, there is a need for fabrication materials that will emit low smoke and heat when burning.

BRIEF SUMMARY OF THE INVENTION

The present invention provides a polycarbonate composition comprising components (A) and (B) wherein component (A) comprises a polycarbonate and component (B) comprises a silsesquioxane.

The present invention further provides a method of making a flame retardant composition comprising providing a polycarbonate and incorporating a flame retardant amount of a silsesquioxane into the polycarbonate.

DETAILED DESCRIPTION OF THE INVENTION

As used hereinafter, the term "flame retardant" means reduced or eliminated in tendency to ignite when exposed to a low-energy flame. The term "UL94 V0" when used in conjunction with "flame retardant" means that a described polycarbonate composition can satisfy the UL94 requirements for VO flammability, as described in the "Flammability of Plastic Materials Bulletin" Jan. 24, 1980. In this test, a 5 inch by ½ inch by 1/16 inch polycarbonate test bar containing an amount of a flame retardant additive is suspended vertically over a ¾ inch Bunsen Burner flame. A material meets requirements for a UL94 V0 rating when a test bar satisfies the following 5 tests: (1) a test bar of the material does not burn with flaming combustion for more than 10 seconds after application of a test flame, (2) no set of five test bars exhibits a total flaming combustion time exceeding 50 seconds for 10 flame applications, (3) no test bar of the material burns with flaming or glowing combustion up to the holding clamp, (4) no test bar drips flaming particles that ignite dry absorbent surgical cotton located 12 inches (305 millimeters) below the bar, and (5) no test bar exhibits glowing combustion that persists for more than 30 seconds after twice applying and removing the test flame.

The polycarbonate composition of the invention contains a silsesquioxane elastomer resin. Silsesquioxanes are siloxanes of the formula $R(SiO_{3/2})_n$ wherein n equals an even number higher than or equal to 4, for example 4, 6, 8, etc. and R is independently at each occurrence phenyl, $C_1-C_8$ alkyl, cycloalkyl, vinyl, or combinations of the same. The silsesquioxanes are cage-like hybrid molecules of silicon and oxygen with similarities to both silica and silicone. When mixed with virtually any ordinary polymer, they bond to the organic molecules and to one another, forming large chains that weave through the polymer. The result may be a nanostructured organic-inorganic hybrid polymer.

The $SiO_{3/2}$ units are assembled into spherical, highly symmetric cage-compounds. Terminal R units are not incorporated into the silicate framework. These structural characteristics led to the name spherosiloxanes. The spherosiloxane class of silsesquioxane shows a broad variety. Many different terminal substituents (organic and inorganic, e.g., R=alkyl, aryl, hydroxy, chlorine) are known. The $SiO_{3/2}$ unit is synthetically accessible to n in a range between about 4 and about 18. Suitable silsesquioxane elastomer resins in the invention include silsesquioxanes of the following formula (I):

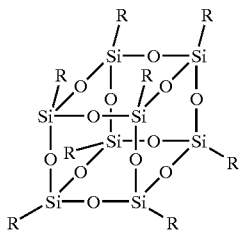

wherein R is independently at each occurrence the same or different moiety selected form the group consisting of phenyl, $C_1-C_8$ alkyl, cycloalkyl, vinyl, and combinations thereof. Preferably, R is selected from phenyl, vinyl, methyl, and combinations thereof. The silsesquioxane in the present invention is typically made via copolymerization of phenylsilsesquioxane with dimethylsiloxane to form a (phenylsilsesquioxane)-co-(dimethyl siloxane) of the general formula, $T^{Ph}_x D_y$ wherein D has the formula $(CH_3)_2SiO_{2/2}$, T has the formula $(C_6H_5)SiO_{3/2}$, subscript x is in a range between about 0.1 and about 1, and subscript y is in a range between about 0.1 and about 1. A further example of a silsesquioxane in the present invention is a poly(phenyl vinyl silsesquioxane) of the general formula $(RSiO_{3/2})_x$ $(RSiO_{3/2})_y(RSiO_{3/2})_z$ where R is independently at each occurrence phenyl, $C_1$–$C_8$ alkyl, cycloalkyl, and vinyl; and x+y+z is the total degree of polymerization of the resin. These and related materials are prepared by hydrolysis condensation of either $RSiCl_3$ or $RSi(OR')_3$. For example, if a 9:1 mole ratio of $(C_6H_5)SiCl_3$ and $vinylSiCl_3$ are hydrolyzed and condensed, then a poly $((C_6H_5)SiO_{3/2})_{0.9x}$ $(vinylSiO_{3/2})_{0.1x}$ resin is obtained.

Among the polycarbonates that can be rendered flame retardant in the practice of the present invention are included aromatic polycarbonates formed, for example, by phosgenating the following bisphenols: p,p'-bisphenol A, m,p-bisphenol A, o,p-bisphenol A, spirobindane bisphenol, tetramethylbisphenol A and tetramethylbiphenol. Copolycarbonates containing the aforementioned bisphenols as a major bisphenol constituent are also included. Preferably, the aromatic polycarbonate is a bisphenol A polycarbonate having an intrinsic viscosity (IV) in a range between about 0.35 deciliters per gram (dl/g) and about 1.8 dl/g in chloroform at 25° C.

Aromatic polycarbonate resins are, in general, prepared by reacting a dihydric phenol with a carbonate precursor or a carbonate ester. Suitable dihydric phenols for preparing polyestercarbonates include those represented by the formula XII:

HO—D—OH          (XII)

wherein D is a divalent aromatic radical. Preferably, D has the structure of formula XIII;

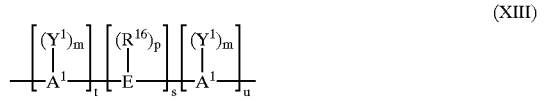

(XIII)

wherein A represents an aromatic group such as phenylene, biphenylene, naphthylene, etc.; and E may be an alkylene or alkylidene group such as methylene, ethylene, ethylidene, propylene, propylidene, isopropylidene, butylene, butylidene, isobutylidene, amylene, amylidene, isoamylidene, etc. Where E is an alkylene or alkylidene group, it may also consist of two or more alkylene or alkylidene groups connected by a moiety different from alkylene or alkylidene, such as an aromatic linkage; a tertiary amino linkage; an ether linkage; a carbonyl linkage; a silicon-containing linkage; or a sulfur-containing linkage such as sulfide, sulfoxide, sulfone, etc.; or a phosphorus-containing linkage such as phosphinyl, phosphonyl, etc. In addition, E may be a cycloaliphatic group (e.g., cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, etc.); a sulfur-containing linkage, such as sulfide, sulfoxide or sulfone; a phosphorus-containing linkage, such as phosphinyl, phosphonyl; an ether linkage; a carbonyl group; a tertiary nitrogen group; or a silicon-containing linkage such as silane or siloxy. $R^{16}$ represents hydrogen or a monovalent hydrocarbon group such as alkyl, aryl, aralkyl, alkaryl, or cycloalkyl. $Y^1$ may be an inorganic atom such as halogen (fluorine, bromine, chlorine, iodine); an inorganic group such as nitro; an organic group such as $R^{16}$ above, or an oxy group such as OR; it being only necessary that $Y^1$ be inert to and unaffected by the reactants and reaction conditions used to prepare the polyestercarbonate. The letter m represents any integer from and including zero through the number of positions on $A^1$ available for substitution; p represents an integer from and including zero through the number of positions on E available for substitution; t represents an integer equal to at least one; s is either zero or one; and u represents any integer including zero.

In the dihydric phenol compound in which D is represented by formula XIII above, when more than one Y substituent is present, they may be the same or different. The same holds true for the $R^{16}$ substituent. Where s is zero in formula XIII and u is not zero, the aromatic rings are directly joined with no intervening alkylidene or other bridge. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups.

Some illustrative, non-limiting examples of dihydric phenols of formula XII include the dihydroxy-substituted aromatic hydrocarbons disclosed by name or formula (generic or specific) in U.S. Pat. No. 4,217,438. Some preferred examples of dihydric phenols include 4,4'-(3,3,5-trimethylcyclohexylidene)diphenol; 2,2-bis(4-hydroxyphenyl)propane (commonly known as bisphenol-A); 2,2-bis(4-hydroxy-3,5-dimethylphenyl)propane; 2,4'-dihyroxydiphenylmethane; bis(2-hydroxyphenyl)methane; bis(4-hydroxy-phenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(3-phenyl-4-hydroxyphenyl)-propane; bis(4-hydroxyphenyl) cyclohexylmethane; 2,2-bis(4-hydroxyphenyl)-1-phenylpropane; resorcinol; and $C_{1-3}$ alkyl-substituted resorcinols.

Suitable dihydric phenols also include those containing spirobiindane structural units such as represented by the formula XIV:

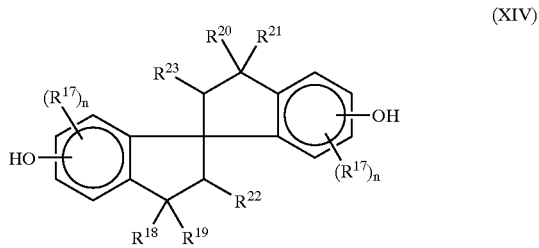

(XIV)

wherein each $R^{17}$ is independently selected from monovalent hydrocarbon radicals and halogen radicals; each $R^{18}$, $R^{19}$, $R^{20}$, and $R^{21}$ is independently $C_{1-6}$ alkyl; each $R^{22}$ and $R^{23}$ is independently H or $C_{1-6}$ alkyl; and each n is independently selected from positive integers having a value in a range between about 0 and about 3 inclusive. The monovalent hydrocarbon radicals represented by $R^{17}$ include alkyl radicals, cycloalkyl radicals, aryl radicals, aralkyl radicals, and alkaryl radicals. Alkyl radicals represented by $R^{17}$ are preferably those containing carbon atoms in a range between about 1 and about 12, and include branched alkyl radicals and straight chain alkyl radicals. Some illustrative non-limiting examples of these alkyl radicals include methyl, ethyl, propyl, isopropyl, butyl, tertiary-butyl, pentyl, neopentyl, and hexyl. Cycloalkyl radicals represented by $R^{17}$ are preferably those containing ring carbon atoms in a range between about 3 and about 12. Some illustrative non-limiting examples of these cycloalkyl radicals include cyclobutyl, cyclopentyl, cyclohexyl, methylcyclohexyl, cycloheptyl. Aryl radicals represented by $R^{17}$ are preferably those containing ring carbon atoms in a range between about 6 and about 12. Some illustrative non-limiting examples of these aryl radicals include phenyl, biphenyl, and naphthyl. Preferred aralkyl and alkaryl radicals represented by $R^{17}$ are those containing carbon atoms in a range between about 7 and about 14. These include, but are not limited to, benzyl, ethylphenyl, phenylbutyl, phenylpropyl, propylphenyl, and phenylethyl. The preferred halogen radicals represented by $R^{17}$ are fluorine, chlorine and bromine.

In the dihydric phenol compound of formula XIV when more than one $R^{17}$ substituent is present they may be the same or different. The relative positions of the hydroxyl groups and $R^{17}$ on the aromatic nuclear residues may be varied in the ortho or meta positions. The position of each hydroxy group is independently at any unsubstituted site on each of the aromatic rings. More preferably, each hydroxy group is independently in positions 5 or 6 and 5' or 6' of each aromatic ring. Most preferably, each hydroxy group is in position 6 and 6' of each aromatic ring.

Preferably, each $R^{17}$ is independently selected from chlorine, bromine, and lower alkyl radicals containing carbon atoms in a range between about 1 and about 5, each $R^{18}$, $R^{19}$, $R^{20}$, and $R^{21}$ is independently $C_{1-6}$ alkyl; each $R^{22}$ and $R^{23}$ is independently H or $C_{1-6}$ alkyl; and each n is independently in a range between about 0 and about 3. More preferably, each $R^{17}$ is independently selected from chlorine and lower alkyl radicals containing carbon atoms in a range between about 1 and about 3, each $R^{18}$, $R^{19}$, $R^{20}$, and $R^{21}$ is independently $C_{1-2}$ alkyl; each $R^{22}$ and $R^{23}$ is independently H or $C_{1-2}$ alkyl; and each n is independently in a range between about 0 and about 2. Still more preferably, each $R^{18}$, $R^{19}$, $R^{20}$, and $R^{21}$ is methyl; each $R^{22}$ and $R^{23}$ is H; and each n is 0.

The Spiro dihydric phenols of formula XIV are compounds that are known in the art and are commercially available or may be readily prepared by known methods. Methods of preparation include, for example, those described in U.S. Pat. No. 4,701,566; and by R. F. Curtis and K. O. Lewis in Journal of the Chemical Society (England), 1962, p. 420; and by R. F. Curtis in Journal of the Chemical Society (England), 1962, p. 417. In one illustrative, non-limiting example, these spiro dihydric phenols may be conveniently prepared by (i) reacting two moles of a phenolic compound with one mole of a carbonyl-containing compound such as acetone, and (ii) thereafter co-reacting 3 moles of the product of (i) under acidic conditions to form the spiro dihydric phenol and 4 moles of a phenolic compound. The acids which may be utilized in (ii) can include such acids as anhydrous methane sulfonic acid, anhydrous hydrochloric acid, and the like.

The most preferred spiro dihydric phenol for forming polyestercarbonates suitable for use in the present invention is 6,6'-hydroxy-3,3,3',3'-tetramethyl-1,1'-spirobiindane ("SBI"), in which n in formula XIV is 0 and the linkages with the rest of the polymer molecule are in a specific position on the aromatic rings.

In the preparation of suitable polyestercarbonates, the dihydric phenols described above may be used alone or as mixtures of two or more different dihydric phenols. For reasons of availability and particular suitability for the purposes of this invention, a preferred dihydric phenol is 2,2-bis(4-hydroxyphenyl)propane (bisphenol-A or "BPA"), in which D in formula XII is bis(4-phenyl)isopropylidene.

Examples of carbonate precursors include, but are not limited to, a carbonyl bromide of a dihydric phenol, a carbonyl chloride of a dihydric phenol, a halogen formate of a dihydric phenol, and a bishaloformate of a dihydric phenol. Examples of carbonate esters include, but are not limited to, diphenyl carbonate, dichlorophenyl carbonate, dinaphthyl carbonate, phenyl tolyl carbonate and ditolyl carbonate.

In a preferred embodiment of the present invention, the aromatic polycarbonate resin comprises one or more resins selected from linear aromatic polycarbonate resins, branched aromatic polycarbonate resins, and poly(estercarbonate) resins. Suitable linear aromatic polycarbonates resins include, but are not limited to, bisphenol A polycarbonate resins. Suitable branched aromatic polycarbonates are made, for example, by reacting a polyfunctional aromatic compound with a dihydric phenol and a carbonate precursor to form a branched polymer. Examples of polyfunctional aromatic compounds include, but are not limited to, trimellitic anhydride, trimellitic acid, trimesic acid, trihydroxy phenyl ethane, and trimellityl trichloride. Suitable poly(estercarbonate) copolymers are made, for example, by reacting a difunctional carboxylic acid such as terephthalic acid, isophthalic acid, 2,6-naphthalic acid, dodecanedioic acid, or mixtures of acids, or a derivative of a difunctional carboxylic acid such as an acid chloride, with a dihydric phenol and a carbonate precursor.

In a preferred embodiment of the present invention, the polycarbonate resin has an intrinsic viscosity in a range between about 0.3 deciliters per gram and about 1.5 deciliters per gram in methylene chloride at 25° C. In a preferred embodiment of the present invention, the polycarbonate resin is a linear polycarbonate resin that is derived from bisphenol A and phosgene. In an alternative preferred embodiment of the present invention, the polycarbonate resin is a blend of two or more polycarbonate resins. When the polycarbonate resin is a blend of two or more polycarbonate resins, the at least two resins may be different because of different monomer content, or the at least two resins may have similar monomer content but be different, for example, because of different molecular weights.

Suitable aromatic polycarbonate resins are commercially available, e.g., LEXAN® bisphenol A-type polycarbonate resins which are produced by General Electric Company.

The silsesquioxane can be intimately mixed with the polycarbonate by compounding in a mixing apparatus such as a Banbury mixer, twin screw extruder, or the like to form a uniform dispersion of the polycarbonate and silsesquioxane.

The amount of flame retardant silsesquioxane should be present in an amount at least sufficient to reduce the flammability of the polycarbonate, preferably to a UL94 V0 rating. The amount will vary, for example, with the nature of the polycarbonate and with the efficiency of the flame retardant silsesquioxane additive. In general, however, the amount of flame retardant silsesquioxane additive is in a range between about 0.1 percent by weight and about 20 percent by weight, desirably in a range between about 0.25 percent by weight and about 10 percent by weight, and preferably in a range between about 0.5 percent by weight and about 3 percent by weight based on the weight of polycarbonate.

The compositions can include the flame retardant silsesquioxane with an additive such as at least one of an anti-drip agent, synergist, stabilizer, impact modifier, or filler. The flame retardant polycarbonate composition can be reinforced with inert fillers such as silica filler, carbon fibers, or glass fibers. The proportion of filler can vary in a range between about 1 part and about 100 parts of filler per 100 parts by weight of the resulting polycarbonate composition. The reinforcing material is typically a glass fiber reinforcing agent, mineral filler, talc, clay, mica, silica, milled glass, flaked glass, or carbon fibers. Preferably, glass fiber or filamentous glass is employed as a reinforcement in the present compositions. For compositions to be employed for electrical uses, it is preferred to use fibrous glass filaments comprising borosilicate glass that is relatively soda-free. This is known as "E" glass. The filaments are made by standard processes, e.g., by steam or air blowing, flame blowing and mechanical pulling. The preferred filaments for plastic reinforcement are typically made by mechanical pulling. The filament diameters are preferably in a range between about 3 microns and about 30 microns. In preparing a molding composition, it is convenient to use the filamentous glass in the form of chopped strands in a range between about ⅛ inch and about ½ inch long.

In other embodiments of the present invention, the composition can include an impact modifier. Particularly useful impact modifiers generally include rubbery impact modifiers. These are well known to those skilled in the art, and any of them normally employed with polyester resins may be employed herein. A preferred impact modifier comprises an acrylic or methacrylic grafted polymer of a conjugated diene or an acrylate elastomer, alone or copolymerized with a vinyl aromatic compound. Particularly useful are core-shell polymers of the type available from Rohm & Haas, for example, those sold under the trade designation Acryloid® (Rohm and Haas Company, Philadelphia, Pa.). In general these impact modifiers contain units derived from butadiene or isoprene, alone or in combination with a vinyl aromatic compound, or butyl acrylate, alone or in combination with a vinyl aromatic compound. Most preferably, the impact modifier will comprise a two stage polymer having either a butadiene or butyl acrylate based rubbery core grafted to a shell composed of polymethyl methacrylate and a second stage polymerized from methylmethacrylate alone, or in combination with styrene. Also present in the first stage are cross linking monomers, graft linking monomers, or combinations thereof. Examples of the crosslinking monomers include, but are not limited to, 1,3-butylene diacrylate, divinyl benzene and butylene dimethacrylate. Examples of graftlinking monomers include, but are not limited to, allyl acrylate, allyl methacrylate and diallyl maleate. Another preferred impact modifier includes a relatively high content of a butadiene polymer grafted base having grafted thereon acrylonitrile and styrene. Other suitable impact modifiers include, but are not limited to, ethylene vinyl acetate, ethylene ethylacrylate copolymers, SEBS (styrene-ethylene-butylene styrene) and SBS (styrene-butadiene-styrene) block copolymers, EPDM (ethylene propylene diene monomer) and EPR (ethylene propylene rubber) copolymers, etc.

The polycarbonate composition can contain a stabilizer. Typically, such stabilizers are used at a level in a range between about 0.01 weight percent and about 10 weight percent and preferably, at a level in a range between about 0.05 weight percent and about 2 weight percent based on the weight of the polycarbonate. The preferred stabilizers include, but are not limited to, one or more of phosphorus oxo acids, an acidic phosphate salt, an acid phosphite, an alkyl phosphite, an aryl phosphite, or a mixed phosphite having at least one hydrogen or alkyl group. The suitability of a particular compound for use as a stabilizer and the determination of how much is to be used as a stabilizer may be readily determined by preparing a mixture of the polycarbonate with and without the particular compound and determining the effect on melt viscosity or color stability. The acidic phosphate salts include, but are not limited to, sodium dihydrogen phosphate, mono zinc phosphate, potassium hydrogen phosphate, calcium hydrogen phosphate and the like. The phosphate can be a salt of a Group IB or Group IIB metal such as zinc phosphate, copper phosphate, and the like. The phosphorus oxo acids include, but are not limited to, phosphorous acid, phosphoric acid, polyphosphoric acid, hypophosphorous acid, or combinations thereof.

In one embodiment of the present invention, the polycarbonate composition is free from halogen additive or heavy metal-containing additive. However in another embodiment of the present invention, the polycarbonate composition can include an adjunct flame retardant ingredient, which in some instances may be a halogenated aromatic flame-retardant. Such retardants include, but are not limited to, tetrabromobisphenol A polycarbonate oligomer, polybromophenyl ether, brominated polystyrene, brominated BPA polyepoxide, brominated imides, brominated polycarbonate, poly(haloaryl acrylate), poly(haloaryl methacrylate) or mixtures thereof. Poly(haloaryl acrylates) are preferred with the most preferred being poly(pentabromobenzyl acrylate).

Examples of other suitable adjunct flame retardants are brominated polystyrenes such as polydibromostyrene and polytribromostyrene; decabromobiphenyl ethane; tetrabromobiphenyl; brominated alpha, omega-alkylene-bis-phthalimides, for example, N,N'-thylene-bis-tetrabromophthalimide; oligomeric brominated carbonates, especially carbonates derived from tetrabromobisphenol A, which may be end-capped with phenoxy groups, brominated phenoxy groups, or brominated epoxy resins. Other examples aromatic carbonate flame retardants are set forth in U.S. Pat. No. 4,636,544 to Hepp. The adjunct flame retardant ingredient may be present in a range between about 10% by weight and about 20% by weight based on the weight percent of polycarbonate resin in the final composition.

A silsesquioxane flame retardant can be used with a synergist such as an inorganic antimony compound. Typical synergists include, but are not limited to, antimony pentoxide ($Sb_2O_5$); antimony sulfide ($SbS_3$) and the like. An especially preferred synergist is antimony oxide ($Sb_2O_3$). The synergist is typically used in a range between about 0.5 percent by weight and about 15 percent by weight, and more preferably in a range between about 1 percent by weight and about 6 percent by weight based on the weight percent of polycarbonate resin in the final composition.

Also, the final composition may contain polytetrafluoroethylene (PTFE) type resins or copolymers used to reduce dripping in flame retardant thermoplastics. The PTFE type resins or copolymers are typically present in a range between about 0.01% by weight and about 1% by weight based on the total composition, and more typically, in a range between about 0.2% by weight and about 0.5% by weight based on the total composition. Preferably ingredients such as stabilizers, mold release, lubricants, colorants, nucleants, antioxidants and UV absorbers are employed in low amounts, typically less than 5 percent by weight of the total composition.

Articles which are molded from the flame retardant polycarbonate composition, especially injection molded enclosures, are suitable for use in electrical communication devices such as cable connections, telephone, computer, video, etc. and network interface devices for residential, commercial and industrial use and in aircraft and skyscraper fabrication.

In order that those skilled in the art will be better able to practice the present invention, the following example is given by way of illustration, and not by way of limitation. All weights are weight percent of the total composition unless otherwise indicated.

EXAMPLE

In this example, polycarbonate blends were formulated with three different siloxane additives—poly(phenyl methyl siloxane), (phenyl silsesquioxane)-co-(dimethyl siloxane), and poly(phenyl vinyl silsesquioxane). Flame bars molded from polycarbonate formulations that contained either (phenyl silsesquioxane)-co-(dimethyl siloxane) or poly(phenyl vinyl silsesquioxane) passed the UL94 flame test with VO rating at ⅛ inch and 1/16 inch thickness.

Polycarbonate compositions are also required to be easy to process. Polycarbonate formulations containing poly(phenyl methyl siloxane) as a flame retardant were very difficult to extrude and to mold. In marked contrast, analogous blends that contained either (phenyl silsesquioxane)-co-(dimethyl siloxane) or poly(phenyl vinyl silsesquioxane) were very easy to process. In addition, molded parts from a formulation containing polycarbonate combined with 5 weight % poly(phenyl vinyl silsesquioxane), a low loading of anti-drip agent poly(tetrafluoroethylene) (0.1 weight %), a synergist such as potassium diphenylsulfone-3-sulfonate (0.3 weight %) and amorphous fumed silica (0.3 weight %) showed improvement in light transmission. Percent transmission was 63.3% at 1/16 inch thickness. Visual comparison of the same formulation with poly (phenyl methyl siloxane) from Table 1 used in place of the silsesquioxane showed a significant difference in opacity with the silsesquioxane formulation appearing translucent versus opaque for the control blend with poly(phenyl methyl siloxane). No percent transmittance value was measured for the control formulation but it was expected to be undesirably low.

The polycarbonates in this Example were obtained from GE Plastics. Three additives: poly(phenyl methyl siloxane), (phenyl silsesquioxane)-co-(dimethyl siloxane), and poly(phenyl vinyl silsesquioxane), were obtained from Gelest Chemicals. The physical and chemical properties of these additives are given in TABLE 1.

TABLE 1

| Additive | % Phenyl | $M_W$ | $M_N$ | Physical State |
|---|---|---|---|---|
| Poly(phenyl methyl siloxane) | — | 1640 | 861 | Viscous liquid |
| (Phenyl silsesquioxane)co-(dimethyl siloxane) | 70 | 8866 | 257 | White solid |
| Poly(phenyl vinyl silsesquioxane) | 90 | 6415 | 1404 | White solid |

Epoxy Epon 828, a bisphenol A oligomeric epoxy resin, was obtained from Shell Chemicals, Epoxy ECN 1299, an ortho cresolformaldehyde novolac resin was obtained from Ciba Specialty Chemicals and Epoxy ERL 4221, a cycloaliphatic diepoxide, was obtained from Union Carbide. The polycarbonate-polytetrafluoroethylene copolymer contained 10% polytetrafluoroethylene (PTFE) dispersed in polycarbonate. Reimer salts, such as potassium perfluorobutane sulfonate, were obtained from two sources: 3M and Bayer Chemicals. Amorphous fumed silica (with a surface area of 140 square meters per gram) was obtained from DeGussa.

The addition of a silsesquioxane to the at least one polycarbonate may be performed by mixing all of the blend components together prior to melt processing. Alternatively, either a silsesquioxane, or a silsesquioxane in combination with at least one other additive may be combined with at least one polycarbonate component as a concentrate in a prior processing step. Such concentrates are often made by melt processing. The concentrate may then be combined with the remaining blend components.

The following general procedure was used to prepare the polycarbonate blends. Dry blends were mixed thoroughly in a Herschel mixer to provide a uniform dispersion of all components. The blends were then extruded on a Welding Engineers twin screw extruder at 500° F. Flame bars for UL94 testing were molded on a 30-ton Engel injection molder. Melt temperature was maintained at 500° F. and the mold temperature was kept constant at 180° F. UL94 testing was performed on bar specimens that had been conditioned prior to testing for a minimum of 48 hours under UL specified temperature and humidity conditions. A minimum of 10 flame bars was tested per sample. Melt flow index (MFI) values were obtained on a Tinius Olsen Extrusion Plastometer. Measurements were performed at 300° C., with a 1.2 kilogram weight and a 6 minute equilabration time. Measurements were run in triplicate and the average was reported.

TABLE 2 includes descriptions of compositions that were evaluated for flame-retardant properties. PC-1, PC-2, PC-3, and PC-4 are bisphenol-A homopolycarbonate resins having intrinsic viscosities of about 0.47 deciliters per gram (dl/g), 0.55 dl/g, 0.65 dl/g and 1.3 dl/g respectively as measured in chloroform at 25° C. PC is a lightly branched polycarbonate.

TABLE 2

| Material | Blend 1 | Blend 2 | Blend 3 | Blend 4 | Blend 5 | Blend 6 |
|---|---|---|---|---|---|---|
| PC-1 (%) | 69.5 | 63.2 | 63.6 | 63.9 | 64.2 | 69.5 |
| PC-2 (%) | 20.0 | 20.0 | 20.0 | 29.5 | 20.0 | 20.0 |
| PC-3 (%) | 5.0 | 5.0 | 5.0 | 0 | 5.0 | 2.8 |
| PC-4 (%) | 0 | 5.0 | 5.0 | 0 | 5.0 | 5.0 |
| PC-PTFE blend (10% PTFE) (%) | 2.5 | 0 | 0 | 2.5 | 1.0 | 2.5 |
| Epoxy resin Epon 828 (%) | 0 | 1.0 | 0 | 0.5 | 0 | 0 |
| Epoxy resin ECN 1299 (%) | 0 | 0 | 1.0 | 0 | 0 | 0 |
| Siloxane Additive (%) | 4.3 | 5.0 | 5.0 | 5.0 | 5.0 | 1.0 |
| Potassium diphenylsulfone sulfonate (%) | 0 | 0 | 0 | 0.3 | 0.3 | 0.3 |
| Potassium perfluorobutyl sulfonate (%) | 0.1 | 0.1 | 0.1 | 0 | 0 | 0 |
| Flow promoter (%) | 0 | 0.3 | 0 | 0 | 0 | 0 |
| Epoxy Additive (Union Carbide ERL 4221) (%) | 0.3 | 0 | 0 | 0 | 0 | 0.3 |
| $CaCO_3$ (%) | 0 | 0.3 | 0 | 0 | 0 | 0.3 |
| $TiO_2$ (%) | 0.3 | 0 | 0.3 | 0.3 | 0 | 0.3 |
| Fumed Silica (%) | 0 | 0 | 0 | 0 | 0.3 | 0 |

Blends 1–6 were formulated for each of the siloxane additives of Table 1. Severe compounding and molding problems were experienced with Blends 1–6 formulated with poly(phenyl methylsiloxane). Additionally, the molded parts exhibited obvious signs of delamination and splay whereas analogous blends containing phenylsilsesquioxane-co-dimethyl siloxane and poly(phenyl vinyl silsesquioxane) were very easy to process and did not show any obvious surface defects.

Polycarbonate compositions containing poly(phenyl methyl siloxane) were formulated as shown in TABLE 2. In Blends 1 and 3, the UL94 performance was evaluated with 10 bars at ⅛ inch and 10 bars at ¹⁄₁₆ inch thickness. The UL94 results including average flame-out time (FOT) and dripping behavior of Blends 3 and 6 are given in TABLE 3.

Polycarbonate blends were next formulated with (phenylsilsesquioxane)-co-(dimethyl siloxane) as per the compositions shown in TABLE 2. Six compositions were injection-molded to ¹⁄₁₆ inch and ⅛ inch thickness flame bars that were evaluated for UL94 performance. The six compositions processed very well. Both thicknesses of all six compositions passed the UL94 test with VO rating. Melt flow index (MFI) values were in a range between about 15 grams per 10 minutes (g/10 min) and about 30 g/10 min indicating excellent flow properties. The UL94 results, melt flow index values and optical properties for each of the six blends are given in TABLE 4. Dripping was not observed for any of the blends for both the ¹⁄₁₆ inch and ⅛ inch thickness flame bars.

TABLE 3

| Blend No. | Average FOT at 1/16 inch | Dripping Observed at 1/16 inch | UL 94 Rating at 1/16 inch | Average FOT at 1/8 inch | Dripping Observed at 1/8 inch | UL 94 Rating at 1/8 inch |
|---|---|---|---|---|---|---|
| 3 | 44.3 sec | Yes | V2 | 3.6 sec | No | VO |
| 6 | 10.1 sec | No | V1 | 3.4 sec | No | VO |

The FOT reported is the average total flame-out time observed for 10 bars.

TABLE 4

| Blend No. | Average FOT at 1/16 inch | UL 94 Rating at 1/16 inch | Average FOT at 1/8 inch | UL 94 Rating at 1/8 inch | MFI (g/10 min) | Optical Properties |
|---|---|---|---|---|---|---|
| 1 | 5.1 sec | VO | 1.2 sec | VO | 16.52 | Opaque |
| 2 | 2.9 sec | VO | 2.1 sec | VO | 17.83 | Opaque |
| 3 | 3.2 sec | VO | 2.2 sec | VO | 22.3 | Opaque |
| 4 | 3.0 sec | VO | 1.9 sec | VO | 30.0 | Opaque |
| 5 | 2.4 sec | VO | 1.5 sec | VO | 15.29 | Opaque |
| 6 | 4.3 sec | VO | 1.5 sec | VO | 20.16 | Opaque |

The FOT reported is the average of the total flame-out time observed for 10 bars.

Blends containing polycarbonate and poly(phenyl vinyl silsesquioxane) as the flame-retardant additive were then formulated as shown in TABLE 2. Injection molded flame bars for all formulations except Blend 2 which was V-1 passed the UL94 test with VO rating at both ⅛ inch and ¹⁄₁₆ inch thickness. Melt flow index values for these compositions were found to lie in a range between about 15 g/10 min and bout 25 g10 min, indicative of excellent melt flow properties. The UL94 results for each formulation and the corresponding melt flow index values are shown in TABLE 5. Dripping was not observed for any of the blends for both the ¹⁄₁₆ inch and ⅛ inch thickness flame bars.

TABLE 5

| Blend No. | Average FOT at 1/16 inch | UL 94 Rating at 1/16 inch | Average FOT at 1/8 inch | UL 94 Rating at 1/8 inch | MFI (g/10 min) | Optical Properties |
|---|---|---|---|---|---|---|
| 1 | 4.78 sec | VO | 3.99 sec | VO | 20.8 | Opaque |
| 3 | 2.86 sec | VO | 2.94 sec | VO | 25.1 | Opaque |
| 4 | 3.21 sec | VO | 2.51 sec | VO | 20.31 | Opaque |
| 5 | 3.74 sec | VO | 2.49 sec | VO | 18.04 | At 1.6 mm % T = 63.3% |
| 6 | 2.74 sec | VO | 2.09 sec | VO | 16.78 | Opaque |

The FOT reported is the average of the total flame-out time observed for 10 bars.

In conclusion, the polycarbonate silsesquioxane containing formulations have good flame retardant properties and their melt flow index values lie in the high flow range (15–30 g/10 min) indicating excellent melt flow properties. Furthermore, these formulations are very easy to process and the phenyl vinyl silsesquioxane-containing compositions showed excellent optical properties (as indicated by the improvement in transmittance previously described). These results demonstrate the advantages of silsesquioxane compositions as effective flame retardants for polycarbonate compositions.

While typical embodiments have been set forth for the purpose of illustration, the foregoing descriptions should not be deemed to be a limitation on the scope of the present invention. Accordingly, various modifications, adaptations, and alternatives may occur to one skilled in the art without departing from the spirit and scope of the present invention.

What is claimed is:

1. A polycarbonate composition comprising components (A) and (B) wherein component (A) comprises at least one polycarbonate and component (B) comprises a flame-retardant amount of a silsesquioxane; and
   wherein the polycarbonate composition further comprises a synergist.
2. The composition of claim 1 wherein the silsesquioxane is present in a range between about 0.1 weight percent and about 20 weight percent based on the weight of the polycarbonate.
3. The composition of claim 2, wherein the silsesquioxane is present in a range between about 0.25 weight percent and about 10 weight percent based on the weight of the polycarbonate.
4. The composition of claim 3, wherein the silsesquioxane is present in a range between about 0.5 weight percent and about 3 weight percent based on the weight of the polycarbonate.
5. The composition of claim 1, wherein the polycarbonate comprises at least one aromatic polycarbonate.
6. The composition of claim 1, wherein the polycarbonate comprises at least one bisphenol A polycarbonate.
7. The composition of claim 1, wherein the silsesquioxane comprises $R(SiO_{3/2})_n$ units, wherein n is an even number in a range between about 4 and about 18.
8. The composition of claim 1, wherein the silsesquioxane comprises $R(SiO_{3/2})_n$ units that form cage-shaped molecules of silicon and oxygen.
9. The composition of claim 1, wherein the silsesquioxane comprises a copolymer of phenylsilsesquioxane and dimethylsiloxane.
10. The composition of claim 1, wherein the silsesquioxane comprises poly(phenyl vinyl silsesquioxane).
11. The composition of claim 1, wherein the silsesquioxane is intimately mixed into the polycarbonate.
12. The composition of claim 1, comprising a uniform dispersion of the polycarbonate and the silsesquioxane.
13. The composition of claim 1, comprising a flame retardant amount of the silsesquioxane.
14. The composition of claim 1, wherein the silsesquioxane comprises the formula (I)

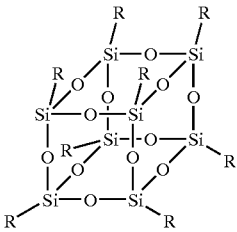

wherein R is independently at each occurrence selected form the group consisting of phenyl, $C_1$–$C_8$ alkyl, cycloakyl, and vinyl.
15. The composition of claim 14, wherein R is selected from phenyl, vinyl, methyl and combinations thereof.
16. The composition of claim 1, further comprising at of stabilizer, impact modifier or filler.
17. The composition of claim 1, further comprising an anti-drip agent.
18. The composition of claim 1, further comprising a polytetrafluoroethylene anti-drip agent.
19. The composition of claim 1, free from halogen additive or heavy metal-containing additive.
20. A flame retardant polycarbonate composition comprising components (A), (B), and (C) wherein component (A) comprises at least one bisphenol A polycarbonate intimately mixed with component (B) and component (C) wherein component (B) comprises a copolymer of phenylsilsesquioxane and dimethylsiloxane which is present in a range between about 0.5 weight percent and about 3 weight percent based on the weight of the polycarbonate, and component (C) comprises a sulfonate compound.

21. A flame retardant polycarbonate composition comprising components (A), (B), and (C) wherein component (A) comprises a bisphenol A polycarbonate intimately mixed with component (B) and component (C) wherein component (B) comprises a poly(phenyl vinyl silsesquioxane) which is present in a range between about 0.5 weight percent and about 3 weight percent based on the weight of the polycarbonate, and component (C) comprises a sulfonate compound.

22. A method of making a polycarbonate composition comprising the following steps:

(I) providing at least one polycarbonate; and (II) incorporating a flame-retardant amount of a silsesquioxane and a synergist into the polycarbonate.

23. The method of claim 22, wherein the silsesquioxane is present in a range between about 0.1 weight percent and about 20 weight percent based on the weight of the polycarbonate.

24. The method of claim 23, wherein the silsesquioxane is present in a range between about 0.25 weight percent and about 10 weight percent based on the weight of the polycarbonate.

25. The method of claim 24, wherein the silsesquioxane is present in a range between about 0.5 weight percent and about 3 weight percent based on the weight of the polycarbonate.

26. The method of claim 22, comprising (II) incorporating a flame retardant amount of the silsesquioxane into the polycarbonate.

27. The method of claim 22, comprising intimately mixing the polycarbonate and silsesquioxane to provide a uniform dispersion.

28. The method of claim 22, wherein the polycarbonate comprises an aromatic polycarbonate.

29. The method of claim 22, wherein the polycarbonate comprises a bisphenol A polycarbonate.

30. The method of claim 22, wherein the silsesquioxane flame retardant comprises a copolymer of phenylsilsesquioxane and dimethylsiloxane.

31. The method of claim 22, wherein the silsesquioxane comprises poly(phenyl vinyl silsesquioxane).

32. The method of claim 22, wherein the silsesquioxane comprises the formula (I)

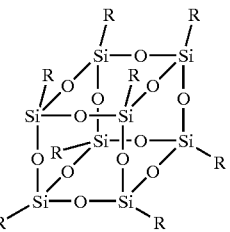

wherein R is independently at each occurrence selected form the group consisting of phenyl, $C_1$–$C_8$ alkyl, cycloalkyl, and vinyl.

33. The method of claim 32, wherein R is selected from phenyl, vinyl, methyl and combinations thereof.

34. The method of claim 22, further comprising extruding and molding the composition into an article.

35. The method of claim 22, further comprising incorporating at least one stabilizer, impact modifier and filler.

36. The method of claim 22, further comprising incorporating an anti-drip agent.

37. The method of claim 22, further comprising incorporating a polytetrafluoroethylene anti-drip agent.

38. A method of making a polycarbonate composition comprising the following steps:

(I) providing at least one bisphenol A polycarbonate; and (II) intimately mixing a sulfonate compound and a copolymer of phenylsilsesquioxane and dimethylsiloxane into the at least one bisphenol A polycarbonate wherein the copolymer is present in a range between about 0.5 weight percent and about 3 weight percent based on the weight of the polycarbonate.

39. A method of making a polycarbonate composition comprising the following steps:

(I) providing at least one bisphenol A polycarbonate; and (II) intimately mixing a sulfonate compound and a poly (phenyl vinyl silsesquioxane) into the at least one bisphenol A polycarbonate wherein the poly(phenyl vinyl silsesquioxane) is present in a range between about 0.5 weight percent and about 3 weight percent based on the weight of the polycarbonate.

40. An article molded from the composition of claim 1.
41. An article molded from the composition of claim 20.
42. An article molded from the composition of claim 21.
43. An article made by the method according to claim 22.
44. An article made by the method according to claim 38.
45. An article made by the method according to claim 39.
46. The composition of claim 1, wherein the synergist comprises an antimony compound, a sulfonate compound, or combination thereof.
47. The method of claim 22, wherein the synergist comprises an antimony compound, a sulfonate compound, or combination thereof.

* * * * *